(12) United States Patent
Wang et al.

(10) Patent No.: US 11,319,690 B2
(45) Date of Patent: May 3, 2022

(54) ASSEMBLED RECYCLABLE RECTANGULAR WORKING WELL WITH PRESET DETACHABLE DOOR OPENING AND CONSTRUCTION METHOD THEREOF

(71) Applicants: Infrastructure Renewal Institute of Southern China, Guangdong (CN); WELEAD Infrastructure Engineering Technology (Zhengzhou), Ltd., Henan (CN)

(72) Inventors: Fuming Wang, Guangdong (CN); Hongyuan Fang, Guangdong (CN); Yanhui Pan, Henan (CN); Peng Zhao, Henan (CN); Chengchao Guo, Henan (CN)

(73) Assignees: Infrastructure Renewal Institute of Southern China, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 70 days.

(21) Appl. No.: 16/892,179

(22) Filed: Jun. 3, 2020

(65) Prior Publication Data
US 2020/0291597 A1   Sep. 17, 2020

(30) Foreign Application Priority Data
Aug. 8, 2019   (CN) .......................... 201910731650.6

(51) Int. Cl.
*E02D 17/04* (2006.01)
*F16L 55/18* (2006.01)
(Continued)

(52) U.S. Cl.
CPC ........... *E02D 17/04* (2013.01); *E02D 29/121* (2013.01); *F16L 55/18* (2013.01);
(Continued)

(58) Field of Classification Search
CPC .......... E02D 17/02; E02D 17/04; F16L 1/028; F16L 1/032; F16L 1/036; F16L 55/18; F16L 55/1657; F16L 55/1658
See application file for complete search history.

(56) References Cited

U.S. PATENT DOCUMENTS

| 3,606,757 A * | 9/1971 | Weese et al. ............. | E02F 5/10 |
| | | | 405/283 |
| 8,651,128 B2 * | 2/2014 | Boyer ....................... | E03F 3/06 |
| | | | 137/15.11 |

(Continued)

FOREIGN PATENT DOCUMENTS

| CN | 111778985 A | * | 10/2020 |
| CN | 112482396 A | * | 3/2021 |

(Continued)

*Primary Examiner* — Frederick L Lagman

(57) ABSTRACT

A method for constructing an assembled recyclable rectangular working well with preset detachable door openings comprises steps of: (I) designing according to functional requirements for a rectangular working well; (II) constructing by supporting piles; (III) installing prefabricated top beam; (IV) edge protection construction; (V) alternate construction of earthwork excavation, retaining slabs and internal support breast beams; (VI) installing the ladder entering the rectangular working well; (VII) rectangular working well back cover; (VIII) demolition of the detachable subsection support piles in the door part and completing the construction of the assembled recyclable rectangular working well in the preset detachable door hole; (IX) after the operation in the well is completed, during the backfilling process of the rectangular working well, gradually recovering the working well components such as the retaining slab, the internal support girder, the prefabricated crown beam and the supporting piles.

5 Claims, 6 Drawing Sheets

(51) Int. Cl.
*E02D 29/12* (2006.01)
*E02D 29/02* (2006.01)
(52) U.S. Cl.
CPC .. *E02D 29/0266* (2013.01); *E02D 2200/1621* (2013.01); *E02D 2200/1642* (2013.01); *E02D 2300/002* (2013.01); *E02D 2300/0029* (2013.01); *E02D 2600/20* (2013.01)

(56) References Cited

U.S. PATENT DOCUMENTS

| | | | | |
|---|---|---|---|---|
| 2013/0108375 | A1* | 5/2013 | Taylor | E02D 17/08 405/282 |
| 2020/0248551 | A1* | 8/2020 | Wang | F16L 55/165 |

FOREIGN PATENT DOCUMENTS

| | | | | | |
|---|---|---|---|---|---|
| DE | 3507730 | A | * | 9/1986 | |
| DE | 4402277 | A1 | * | 8/1995 | ............. E02D 17/08 |
| GB | 2264733 | A | * | 9/1993 | ............. F16L 55/18 |
| KR | 102173283 | B1 | * | 11/2020 | |

* cited by examiner

ASSEMBLED RECYCLABLE RECTANGULAR WORKING WELL WITH PRESET DETACHABLE DOOR OPENING AND CONSTRUCTION METHOD THEREOF

CROSS REFERENCE OF RELATED APPLICATION

The present application claims priority under 35 U.S.C. 119(a-d) to CN 201910731650.6, filed Aug. 8, 2019.

BACKGROUND OF THE PRESENT INVENTION

Field of Invention

The present invention belongs to the non-excavation construction and repair field of infrastructure such as water conservancy, municipal, thermal, and communication, and particularly relates to providing an assembled recyclable rectangular working well with the preset detachable door opening and a construction method thereof for non-excavation construction and repair of underground pipelines such as water conservancy, municipal, thermal, and communication.

Description of Related Arts

The acceleration of the urbanization process needs to not only build a large number of underground infrastructure facilities, but also face the problem of overdue service of a large number of old underground pipelines, which makes many urban roads underground pipeline networks very complicated. Road collapse and safety accidents caused by underground pipeline damage frequently occur. Under the circumstance that traffic requirements and green environmental protection concepts are increasingly valued, the conventional excavation and landfill construction method is low in efficiency and facing serious post-construction settlement, and it is primarily used for shallow buried rainwater and sewage pipes during the construction of new urban areas. Non-excavation construction technologies such as directional drilling and pipe jacking have gradually become the mainstream technologies of urban underground pipelines. Among them, pipe jacking is getting more and more attention from engineers due to the characteristics of the flexible cross-section selection and large burial depth, and that it can effectively avoid conflicts with existing pipelines in the upper part, and that it needs only a small space to set up the corresponding working wells, receiving wells, and relay rooms to meet the requirement of the construction of long-distance underground pipelines. In addition, during the rectification and upgrade of a large number of old pipe networks in the old city, when constructing the small-section pipe gallery structures with the pipe jacking method, the temporary addition of working wells is required to ensure the personal safety in underground. At present, with regard to the design and construction of working wells, receiving wells and relay rooms, the sinking process or the inverted well process is still the main choice. Although it is safe and reliable, it is expensive and has a long construction period, and there exists problem of sinking difficulty and risks of tilts and instability accidents caused by the improper operations, especially when opening the rear door, which is difficult and time-consuming.

SUMMARY OF THE PRESENT INVENTION

Based on the requirements of the development of the non-excavation construction and repairing of underground pipelines such as water conservancy pipes, municipal pipes, heating pipes, and communication pipes, and the shortcomings of current design and construction working wells, the present invention provides an assembled recyclable rectangular working well with a preset detachable door opening and its construction method thereof. From the perspectives of safety and usage of the rectangular working wells, this invention, for the first time, proposes the concept that the conventional post-opening door openings that are designed and implemented synchronously with the working well structure, and introduces the assembly construction process into the working well structure system. By using this invention, the construction of rectangular working wells required for non-excavation construction of underground pipelines can be finished safely and quickly. After completion of the construction working in the well, during the backfilling process, the components that make up the rectangular working well can be efficiently recycled in sequence for reusing. The technology is a new method for the design and construction of rectangular working wells required for the non-excavation construction of underground pipelines containing the water conservancy pipes, municipal pipes, heating pipes, and communication pipes. It is safe, fast, technologically advanced, cost-saving and eco-friendly and recyclable and reusable.

The technical solutions of the present invention are specifically as follows.

A method for constructing an assembled recyclable rectangular working well with the preset detachable door opening and the specific steps are as follows:

(I) designing according to functional requirements of a rectangular working well, comprising:

(1) collecting relevant data to determine a plane size, a depth, and a method of sealing the working well;

(2) determining a height and size of the preset detachable door openings according to a location, diameter and material of the proposed pipeline, presetting an amount of the detachable door openings to be at least one;

(3) structural calculation and drawing of rectangular working wells, using rod system method and numerical simulation comparison calculation analysis to obtain the optimal rectangular working pit supporting structure composition, and then drawing to complete the functional requirements design work of rectangular working wells;

(II) construction of the supporting piles, comprising:

(1) pre-processing of the supporting piles: according to the design results of the rectangular working well, respectively pre-processing the supporting piles; taking into account construction requirements of the preset detachable door opening, the detachable segmented supporting piles are used at the top of the detachable door opening; wherein the detachable segmented supporting piles are lengthened by the lateral connection of the tension bolts and the connection steel plates; the reinforced supporting piles are used opposite the detachable door opening and the standard supporting piles are used for other parts;

(2) on-site construction of the supporting piles: precisely determining the position of the piles, and then respectively constructing and installing three types of supporting piles;

(3) determining the cross-sectional shapes and raw materials of the supporting piles according to the calculation results; wherein the cross-sectional shape includes, but is not limited to, square or circular, and the raw material is the reinforced concrete or section steel;

(III) installing prefabricated crown beams, wherein construction steps comprises:

(1) pre-processing of the prefabricated crown beams: processing prefabricated crown beams in advance according to the plane size of rectangular working wells and the planar layout of three types of support piles, wherein the prefabricated crown beams are connected to the supporting piles by bolts;

(2) on-site construction of prefabricated crown beams: according to the plane size of the rectangular working wells, hoisting the prefabricated crown beams and bolt fastening to the supporting piles after leveling in sections or as a whole;

(3) selecting the cross-sectional shapes and materials of the prefabricated crown beam according to the calculation results; wherein the cross-sectional shape comprises, but is not limited to the prefabricated crown beams anchored bilaterally with the supporting piles or anchored unilaterally on the inner wall of the supporting piles, and the material is the reinforced concrete or section steel;

(IV) the edge protection construction: after installing the prefabricated crown beams, setting an edge protection on the prefabricated crown beams, wherein the edge protection and the prefabricated crown beams are connected by bolts;

(V) alternate construction of earth excavation, retaining slabs installation and internal support breast beams installation, wherein the construction steps comprises:

(1) excavating the soil in rectangular working wells in layers and installing the retaining panels, the retaining panels and the supporting piles are assembled by lateral hooks;

(2) after reaching the predetermined excavation depth, the internal supporting breast beams are installed;

(3) repeating steps (1) and (2) until reaching to the designed bottom elevation of the rectangular working well;

(VI) ladder installation into the rectangular working well: setting the arrangement of ladder in the working well according to the distance between the internal supporting breast beams and the specific dimensions of the operating equipment. The ladder is connected to the internal supporting breast beams by hooks;

(VII) rectangular working well sealing: the working well needs be sealed with crushed stoner or concrete to meet the needs of the subsequent construction;

(VIII) removing the detachable segmented supporting piles at the door opening: removing the detachable segmented supporting piles at the preset detachable door opening, and finishing the construction of the assembled recyclable rectangular working well in the preset detachable door opening.

The method for constructing the assembled recyclable rectangular working well with the preset detachable door opening further comprises steps of: after finishing the operation in the well, filling the well, and during the backfilling process removing and recycling the components comprising the retaining slab, the internal supporting girder, the prefabricated crown beam and the supporting piles subsequently.

An assembled recyclable rectangular working well with the preset detachable door opening comprises: a rectangular working well (1) and a supporting piles; wherein the bottom of the rectangular working well (1) is sealed, and a preset detachable door opening (3) is installed in the rectangular working well (1) the preset detachable door opening (3) is where the jacking pipes are pushed in; the supporting piles are arranged against the inner wall of the rectangular working well (1), and the retaining plate (12) is spliced between two adjacent supporting piles; a height of the supporting pile is greater than the depth of the rectangular working well; to be specific, the upper part of the supporting piles is leveled with the upper part of the rectangular working well (1), whereas the lower part extends a distance to the soil below the bottom of the working well (1) for stabilizing the supporting piles; A prefabricated crown beam (9) is provided on the top of the rectangular working well (1). the prefabricated crown beam (9) is bolted to the supporting pile; the crown beam (9) is installed on both sides of the supporting piles to clamp them, or only internally as required; at least one inner supporting breast beam (13) is provided between the prefabricated crown beam (9) and the bottom (2) to support the crown beam (9); the supporting breast beam (13) is bolted to the supporting piles.

The supporting pile includes a detachable segmented supporting pile (4), a reinforced supporting pile (7) and a standard supporting pile (8), the detachable segmented supporting pile (4) is arranged at the preset detachable door opening (3) and it can be lengthened in the lengthwise direction by the tie bolt (5) and the connecting steel plate (6). The reinforced support pile (7) is placed opposite to the preset detachable door opening (3). The cross-sectional area of the reinforced supporting piles (7) is larger than that of the detachable sectioned supporting pile (4) and that of the standard supporting pile (8); the rest parts of the door opening are provided with the standard support pile (8). During excavation, the retaining plate (12) shall be removed, and then the detachable segmented supporting pile (4) is removed for jacking pipes. In the process of pipe jacking, the back of the pipe jacking equipment bears the horizontal force jacking force, and the supporting piles can thus be reinforced to avoid the deformation of working well. By designing these three types of the supporting piles, the whole supporting system is easy to build and it is more reasonable from the point of view of mechanical stability and function.

Preferably, hooks are provided on the sides of the earth retaining panel (12) and there are two hooks on each side. Drilling holes corresponding to the hook positions are provided on the supporting piles. The earth retaining panels (12) are connected to the supporting piles through the hooks, which is easy to work and safe.

The prefabricated crown beam (9) is provided with border protection (1)

Preferably, the rectangular working well (1) is provided with a ladder (15), and a hook is provided on the ladder (15); wherein in the length direction of the ladder (15), the distance between the hooks is identical to the distance between the inner support breast beams (13); the ladder (15) is connected to the inner support lumbar beam (13) by hooks.

Compared with the prior art, the technical effects of the present invention are as follows.

(1) Advanced technology concept, integrated design and construction of preset detachable door opening and rectangular working well structure, not only overcome the construction difficulties of the rear opening door, but also save the corresponding capital investment. While providing underground safe working space, it also shortens the construction period of the working well.

(2) For the first time, the supporting piles are proposed innovatively and the classification design and combination of standard supporting piles, detachable segmented supporting piles and reinforced supporting piles are adopted, which can effectively exert the mechanical properties of materials and ensure the working well function Play, and save unnecessary material costs.

(3) Work well components are prefabricated in advance, on-site assembly construction, no maintenance is needed, saving the work well excavation and construction work, the original retaining wall side hook connection installation process, the construction is convenient and fast, and it can be recycled and reused. It can realize the standardized design and construction of rectangular working well structure.

(4) The same set of rectangular working well structures constructed by the technology of the present application can solve the repeated construction tasks of rectangular working wells with similar surrounding environment within a certain depth range, which is green and economical and saves waste of resources.

(5) Ecological harmony, high environmental protection and high cost performance. Compared with the traditional working well construction technology, the biggest feature of this application is that the prefabrication is classified in advance according to different functional requirements. During the on-site implementation stage, the assembly type continuous operation significantly reduces the construction period, and can reduce the environmental pollution impacts such as radon, dust, and flying dust, and reduce the impact of construction on the surrounding environment.

The present invention is significantly different from the current working well technology in terms of design and construction concepts, structural system forces, construction methods, recycling and reuses values, etc. of the rectangular working well structure. Reuse, green economy, ecological harmony and other advantages, and successfully applied to rectangular working well construction projects, the development and application prospects are considerable.

DETAILED DESCRIPTION OF THE PREFERRED EMBODIMENT

Figure 1:
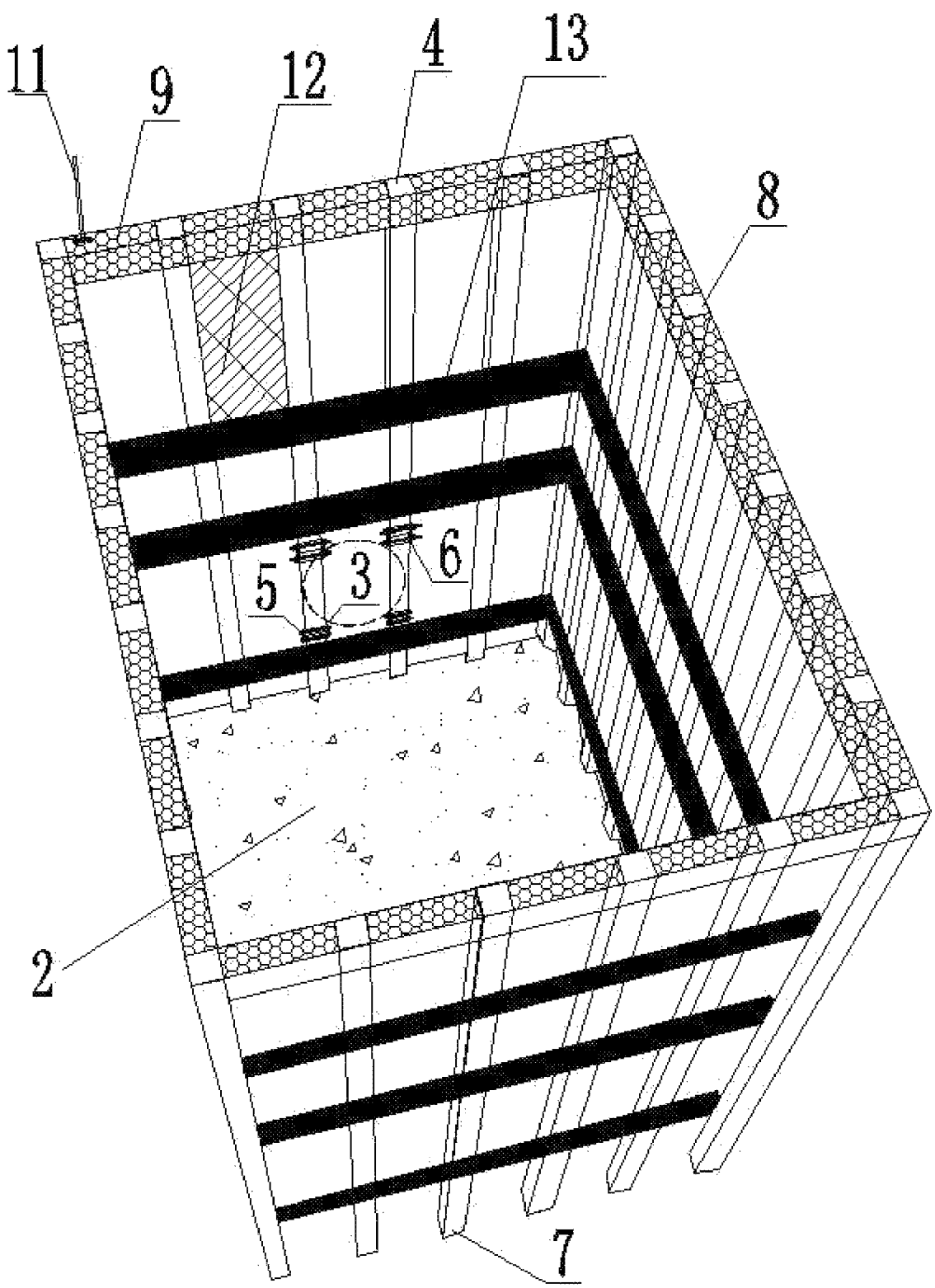
FIG. 1 is an overall structural diagram of an assembled recyclable rectangular working well with preset detachable door opening according to a preferred embodiment of the present invention.
Figure 2:
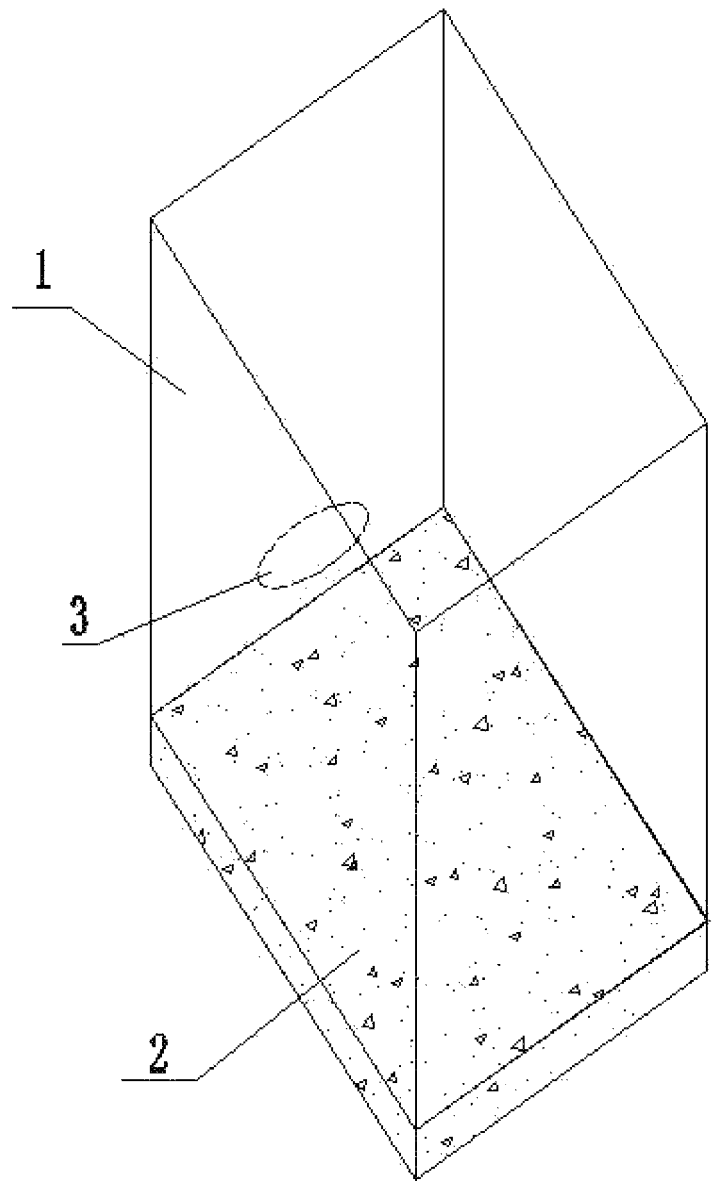
FIG. 2 is a functional structural diagram of the rectangular working well according to the preferred embodiment of the present invention.
Figure 3:
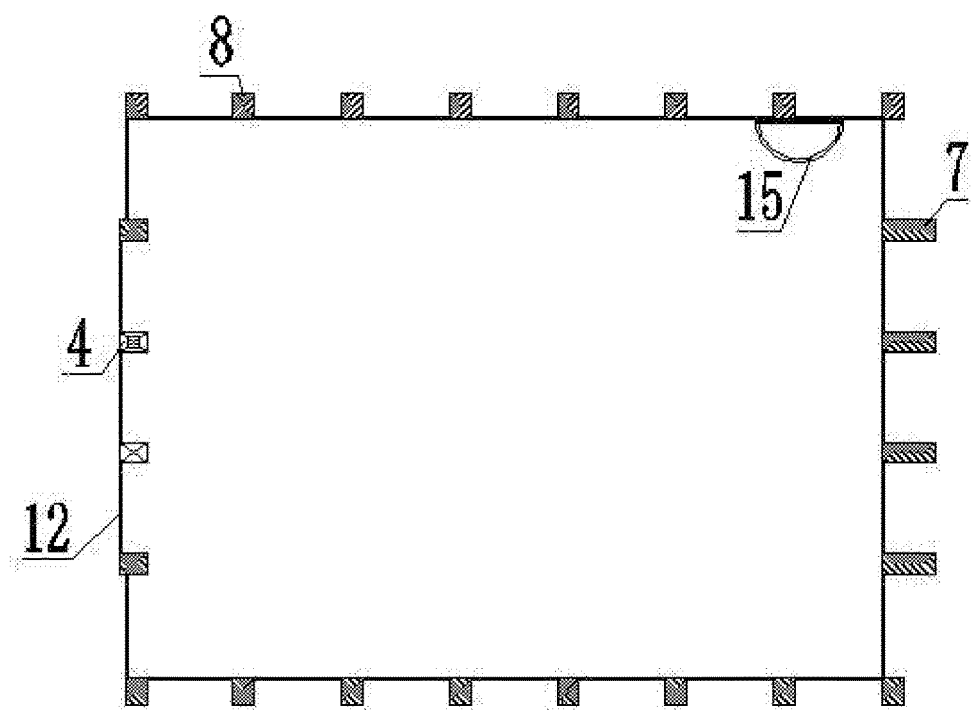
FIG. 3 is a plan view of a supporting pile of the present invention.
Figure 4:
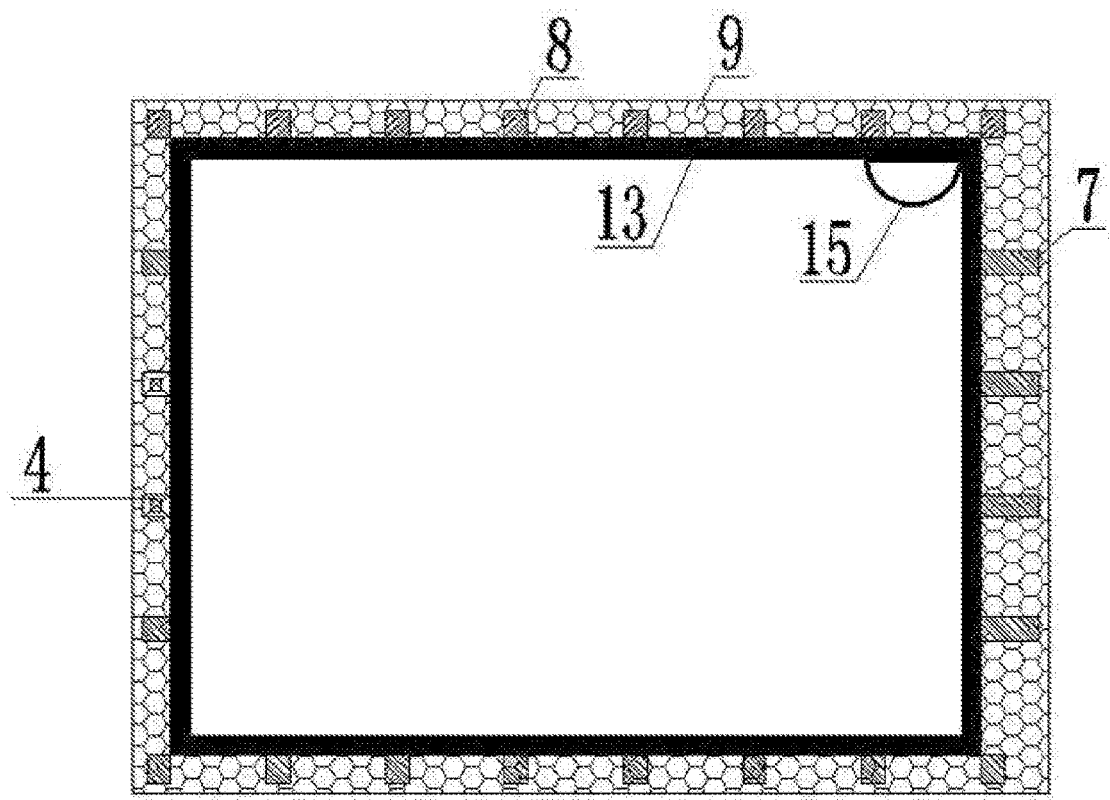
FIG. 4 is a plan view of a top beam of the present invention.
Figure 5:
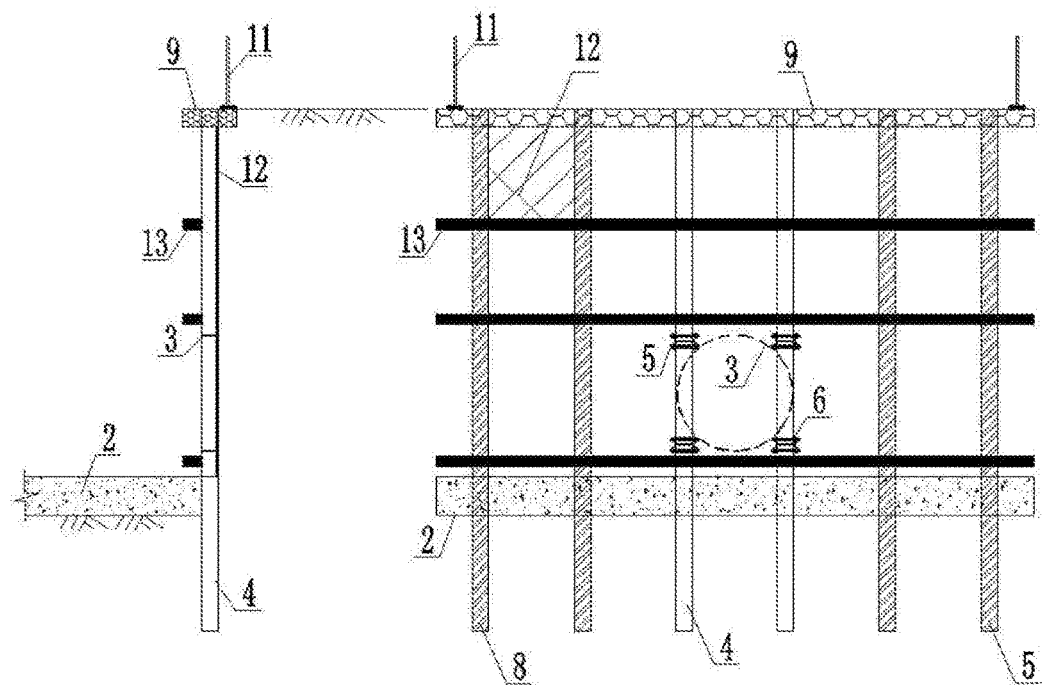
FIG. 5 is a sectional axonometric view of the rectangular working well of the present invention.
Figure 6:
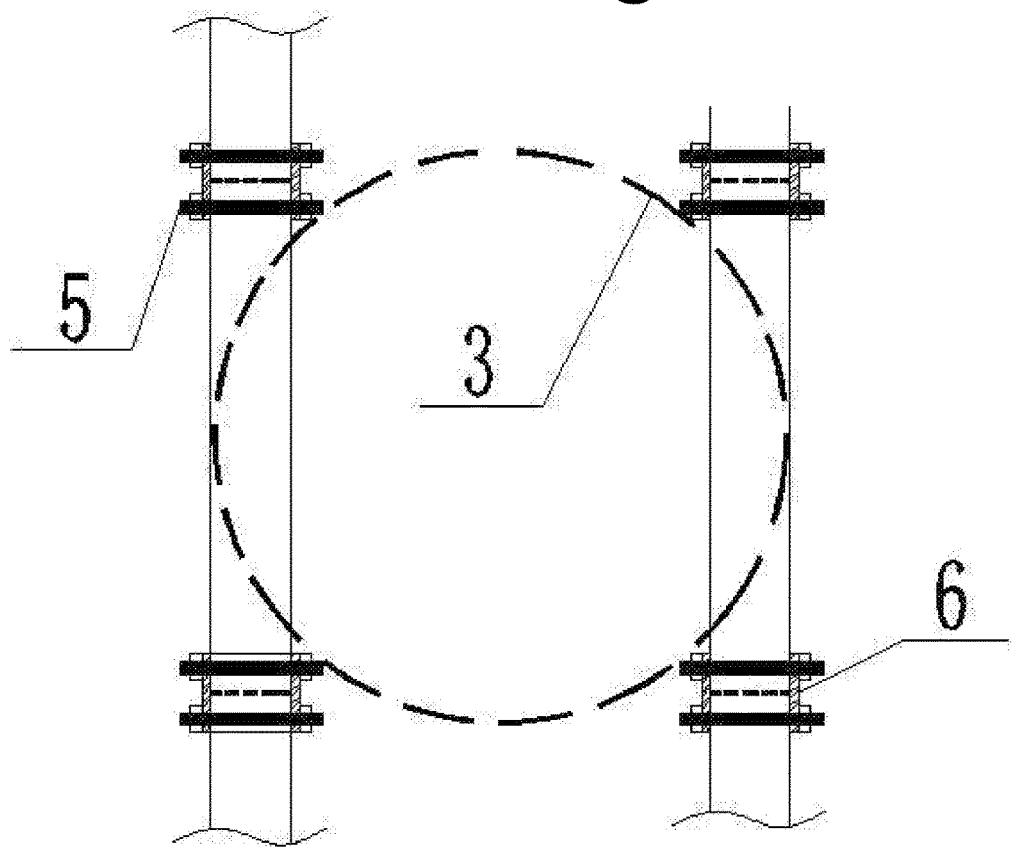
FIG. 6 is a structural diagram of a detachable segmented support pile of the present invention.
Figure 7:
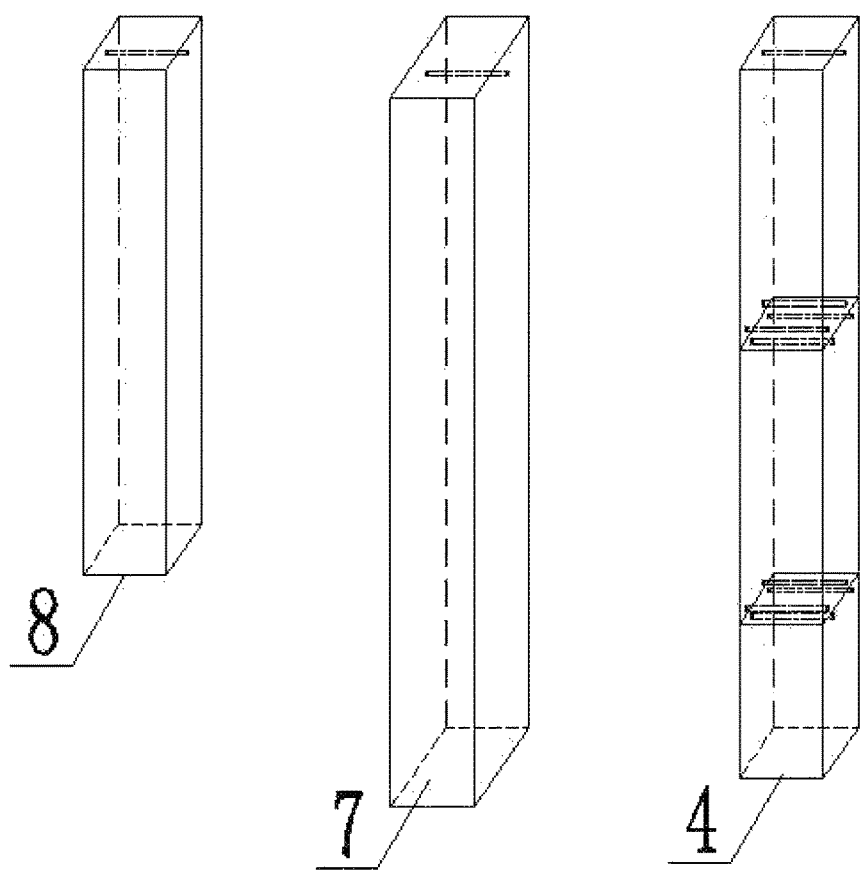
FIG. 7 is a structural diagram of the supporting pile of the present invention.
Figure 8:
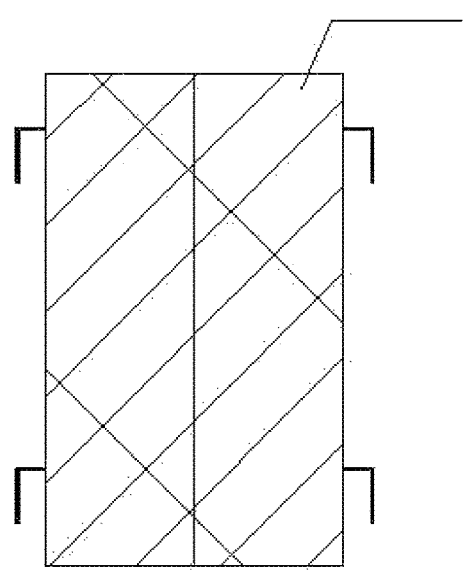
FIG. 8 is a structural diagram of a retaining panel of the present invention.
Figure 9:
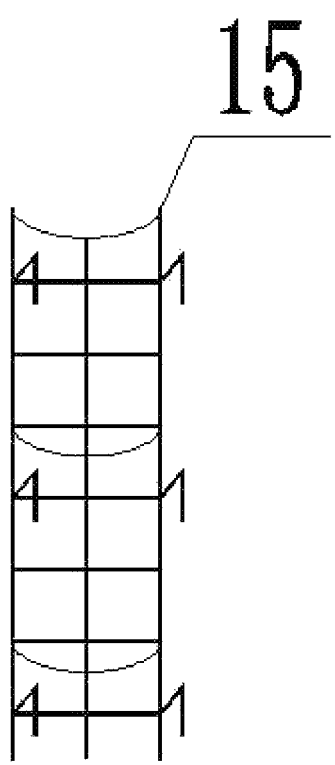
FIG. 9 is a structural diagram of a climbing ladder of the present invention.

A method for constructing a prefabricated recyclable rectangular working well with a detachable door opening is provided. First, the functional requirements design of the rectangular working well is completed; then the supporting pile construction, the prefabricated crown beam installation, and the edge protection construction are carried out in turn; Earthwork excavation of work shafts, alternate construction of retaining panels, internal support lumbar beams; installation of ladders entering rectangular work shafts and back cover of moment work shafts, and finally removal of sectioned support piles and retaining panels at the portal site, i.e. Construction of prefabricated recyclable rectangular working wells with detachable door openings can be completed; after completion of the well operation, working well components such as retaining panels, internal support breast beams, crown beams and supporting piles are gradually recovered during the backfilling process. It includes the following steps.

A method for constructing an assembled recyclable rectangular working well with preset detachable door openings comprises steps of:

(I) designing according to functional requirements of a rectangular working well, comprising:

(1) collecting relevant data to determine a plane size, a depth, and a method of sealing the working well;

(2) determining a height and size of the preset detachable door openings according to a location, diameter and material of the proposed pipeline, presetting an amount of the detachable door openings to be at least one;

(3) structural calculation and drawing of rectangular working wells, using rod system method and numerical simulation comparison calculation analysis to obtain the optimal rectangular working pit supporting structure composition, and then drawing to complete the functional requirements design work of rectangular working wells;

(II) construction of the supporting piles, comprising:

(1) pre-processing of the supporting piles: according to the design results of the rectangular working well, respectively pre-processing the supporting piles; taking into account construction requirements of the preset detachable door opening, the detachable segmented supporting piles are used at the top of the detachable door opening; wherein the detachable segmented supporting piles are lengthened by the lateral connection of the tension bolts and the connection steel plates; the reinforced supporting piles are used opposite the detachable door opening and the standard supporting piles are used for other parts;

(2) on-site construction of the supporting piles: precisely determining the position of the piles, and then respectively constructing and installing three types of supporting piles;

(3) determining the cross-sectional shapes and raw materials of the supporting piles according to the calculation results; wherein the cross-sectional shape includes, but is not limited to, square or circular, and the raw material is the reinforced concrete or section steel;

(III) installing prefabricated crown beams, wherein construction steps comprises:

(1) pre-processing of the prefabricated crown beams: processing prefabricated crown beams in advance according to the plane size of rectangular working wells and the planar layout of three types of support piles, wherein the prefabricated crown beams are connected to the supporting piles by bolts;

(2) on-site construction of prefabricated crown beams: according to the plane size of the rectangular working wells, hoisting the prefabricated crown beams and bolt fastening to the supporting piles after leveling in sections or as a whole;

(3) selecting the cross-sectional shapes and materials of the prefabricated crown beam according to the calculation results; wherein the cross-sectional shape comprises, but is not limited to the prefabricated crown beams anchored bilaterally with the supporting piles or anchored unilaterally on the inner wall of the supporting piles, and the material is the reinforced concrete or section steel;

(IV) the edge protection construction: after installing the prefabricated crown beams, setting an edge protection on the prefabricated crown beams, wherein the edge protection and the prefabricated crown beams are connected by bolts;

(V) alternate construction of earth excavation, retaining slabs installation and internal support breast beams installation, wherein the construction steps comprises:

(1) excavating the soil in rectangular working wells in layers and installing the retaining panels. the retaining panels and the supporting piles are assembled by lateral hooks;

(2) after reaching the predetermined excavation depth, the internal supporting breast beams are installed;

(3) repeating steps (1) and (2) until reaching to the designed bottom elevation of the rectangular working well;

(VI) ladder installation into the rectangular working well: setting the arrangement of ladder in the working well according to the distance between the internal supporting breast beams and the specific dimensions of the operating equipment. The ladder is connected to the internal supporting breast beams by hooks;

(VII) rectangular working well sealing: the working well needs be sealed with crushed stoner or concrete to meet the needs of the subsequent construction;

(VIII) removing the detachable segmented supporting piles at the door opening: removing the detachable segmented supporting piles at the preset detachable door opening, and finishing the construction of the assembled recyclable rectangular working well in the preset detachable door opening.

The method for constructing the assembled recyclable rectangular working well with the preset detachable door opening further comprises steps of: after finishing the operation in the well, filling the well, and during the backfilling process removing and recycling the components comprising the retaining slab, the internal supporting girder, the prefabricated crown beam and the supporting piles subsequently.

(IX) after finishing the operation in the well, filling the well, and during the backfilling process removing and recycling the components comprising the retaining slab, the internal supporting girder, the prefabricated crown beam and the supporting piles subsequently.

In this application, a rectangular cross-section pile support structure, a foundation pit buttress-type row support, a support pile, and an internal support lumbar beam support structure are formed. The rigidity of the rectangular cross-section pile support is used to realize the foundation pit excavation. The slope of the process is stable, and the prefabricated crown beam plays a structural coordination role in most cases. The steel retaining panel acts as a temporary retaining structure. The support system is relatively simple. The earth pressure on the side wall of the foundation pit is almost entirely borne by the rectangular cross-section piles. The deformation of the side wall of the working pit due to earth pressure is reduced, and the mechanical transmission path is single and direct. In terms of calculation method, it belongs to the cantilever beam structure system. When the earth pressure is too large, it can also resist deformation by adding a support between the two sides.

The construction process takes into account the mechanical requirements of the two construction processes, and simultaneously considers the forces and structural functions of the two processes of excavation support and pipe jacking construction, avoiding the conflict between the digging support and pipe jacking construction.

An assembled recyclable rectangular working well with a preset detachable door opening comprising: a rectangular working well 1 and a supporting piles; wherein the bottom of the rectangular working well 1 is sealed, and a preset detachable door opening 3 is installed in the rectangular working well 1 the preset detachable door opening 3 is where the jacking pipes are pushed in; the supporting piles are arranged against the inner wall of the rectangular working well 1, and the retaining plate 12 is spliced between two adjacent supporting piles; a height of the supporting pile is greater than the depth of the rectangular working well; to be specific, the upper part of the supporting piles is leveled with the upper part of the rectangular working well 1, whereas the lower part extends a distance to the soil below the bottom of the working well 1 for stabilizing the supporting piles; wherein a prefabricated crown beam 9 is provided on the top of the rectangular working well 1. the prefabricated crown beam 9 is bolted to the supporting pile.

The crown beam 9 is installed on a top of the rectangular working well 1. The prefabricated crown beam 9 is bolted to the supporting pile. The prefabricated crown beam 9 clamps the supporting pile on both sides of the supporting pile, or only the inside of the precast crown beam 9 can be bolted to the supporting pile as needed. At least one inner supporting breast beam 13 is provided between the prefabricated crown beam 9 and the bottom 2 to support the crown beam 9; the supporting breast beam 13 is bolted to the supporting piles.

The supporting pile includes a detachable section supporting pile 4, a reinforced supporting pile 7 and a standard supporting pile 8, the detachable segmented supporting pile 4 is arranged at the preset detachable door opening 3 and it can be lengthened in the lengthwise direction by the tie bolt 5 and the connecting steel plate 6, The reinforced support pile 7 is placed opposite the preset detachable door opening 3; the cross-sectional area of the reinforced supporting piles 7 is larger than that of the detachable sectioned supporting pile 4 and that of the standard supporting pile 8; the rest parts of the door opening are provided with the standard support pile 8. When the pipe jacking is performed, the retaining panel for retaining the earth when the earthwork is excavated is removed, and then the detachable place at the preset detachable door opening 3 is removed. After the sectioned support pile 4 is removed, the pipe jacking work is performed. Reinforcement support piles 7 are located opposite the preset detachable door openings 3. When the pipe jacking device is pushed into the pipe jack, the back of the pipe jacking device bears all the horizontal jacking forces of the pipe jacking to strengthen the support piles on the force surface, avoiding deformation of the circular work pit opposite the door opening. By setting three different types of supporting piles, the actual operability is stronger, and the mechanical system and functional structure can better meet the needs of engineering construction.

Hooks are provided on sides of the earth retaining panel 12, and two hooks are provided on each side. The inner wall of the circular working pit is covered by a piece of retaining panel 12, the retaining panel 12 is provided with hooks on the side, two on each side, and the supporting pile is provided with a drilled hole connected with the hook, and the retaining panel 12. It is connected to the supporting pile by a hook, and the connection is realized by a hook, which is simple and safe, and convenient for subsequent recycling.

The rectangular working well 1 is provided with a ladder 15, and a hook is provided on the ladder 15; in the length direction of the ladder 15, the distance between the hooks is same with the distance between the inner support breast beams 13; ladder 15 is connected to the inner support lumbar beam 13 by hooks.

The rectangular working well 1 is provided with a ladder 15, and a hook is provided on the ladder 15; in the length direction of the ladder 15, the distance between the hooks is same with the distance between the inner support breast beams 13; the ladder (15) is connected to the inner support lumbar beam (13) by hooks.

The invention adopts an original combination of detachable segmented support piles and partially reinforced support piles to perform advanced support for rectangular working wells. The detachable doorway portion is preset to use detachable segmented support piles and uses internal support breast beams. The flexible layout further strengthens the structural stability to meet the needs of subsequent construction, which can save investment and speed up the construction progress, and provides a new set of work well design and construction technology for non-excavation construction of underground pipelines such as water conservancy, municipal, thermal, and communications. Not only has the construction method of the conventional rear door opening been changed, and the synchronous design of the preset detachable door opening and the rectangular working well is adopted, which can be simply disassembled when in use, and the rectangular working well components are prefabricated, which has high recycling value and is repeatable. Take advantage of other features.

What described above are only preferred embodiments of the present invention. It should be noted that for those skilled in the art, without departing from the overall concept of the present invention, several changes and improvements can be made. These should also be considered as the present invention.

What is claimed is:

1. A method for constructing an assembled recyclable rectangular working well with a preset detachable door opening, comprising steps of:
   (I) designing according to functional requirements of a rectangular working well, comprising:
   (1) collecting relevant data to determine a plane size, a depth, and a method of sealing the working well;
   (2) determining a height and a size of the preset detachable door opening according to a location, a diameter and materials of the proposed pipeline, presetting an amount of the detachable door openings to be at least one;
   (3) calculating a structure and a drawing of rectangular working wells, using rod system method and numerical simulation comparison calculation analysis to obtain an optimal rectangular working pit supporting structure composition, and then drawing to complete the designing according to the functional requirements of the rectangular working well;
   (II) constructing supporting piles, comprising:
   (1) pre-processing the supporting piles: according to design results of the rectangular working wells, respectively pre-processing the supporting piles; taking construction requirements of the preset detachable door opening into account, detachable segmented supporting piles are used at a top of the detachable door opening; wherein the detachable segmented supporting piles are lengthened by lateral connection of tension bolts and connection steel plates; reinforced supporting piles are used opposite the detachable door opening and standard supporting piles are used for other parts;
   (2) on-site constructing the supporting piles: precisely determining the position of the piles, and then respectively constructing and installing three types of supporting piles;
   (3) determining cross-sectional shapes and raw materials of the supporting piles according to calculation results; wherein a cross-sectional shape comprises, but is not limited to, square or circular, and a raw material is a reinforced concrete or section steel;
   (III) installing prefabricated crown beams, wherein construction steps comprises:
   (1) pre-processing of the prefabricated crown beams: processing prefabricated crown beams in advance according to the plane size of rectangular working wells and the planar layout of three types of support piles, wherein the prefabricated crown beams are connected to the supporting piles by bolts;
   (2) on-site construction of prefabricated crown beams: according to the plane size of the rectangular working wells, hoisting the prefabricated crown beams and bolt fastening to the supporting piles after leveling in sections or as a whole;
   (3) selecting the cross-sectional shapes and materials of the prefabricated crown beam according to the calculation results; wherein the cross-sectional shape comprises, but is not limited to the prefabricated crown beams anchored bilaterally with the supporting piles or anchored unilaterally on the inner wall of the supporting piles, and the material is the reinforced concrete or section steel;
   (IV) constructing edge protection: after installing the prefabricated crown beams, setting an edge protection on the prefabricated crown beams, wherein the edge protection and the prefabricated crown beams are connected by bolts;
   (V) alternate constructing earth excavation, retaining panel installation and internal support breast beams installation, wherein construction steps comprises:
   (1) excavating the soil in rectangular working wells in layers and installing the retaining panels; wherein the retaining panels and the supporting piles are assembled by lateral hooks;
   (2) after reaching a predetermined excavation depth, installing the internal supporting breast beams;
   (3) repeating steps (1) and (2) until reaching to a designed bottom elevation of the rectangular working well;
   (VI) installing ladder into the rectangular working well: setting the arrangement of ladder in the working well according to a distance between the internal supporting breast beams and a specific dimensions of an operating equipment; wherein the ladder is connected to the internal supporting breast beams by hooks;
   (VII) sealing the rectangular working well: sealing the working well with crushed stone or concrete to meet requirements of the subsequent construction;
   (VIII) detaching the detachable segmented supporting piles at the door opening, comprising: detaching the detachable segmented supporting piles at the detachable door opening preset, and finishing construction of the assembled recyclable rectangular working well with the preset detachable door opening.

2. The method for constructing the assembled recyclable rectangular working well with the preset detachable door opening, as recited in claim 1, further comprising a step of: after finishing the operation in the well, backfilling the well, and during a process of the backfilling removing and recycling the components comprising the retaining slab, the internal supporting girder, the prefabricated crown beam and the supporting piles subsequently.

3. An assembled recyclable rectangular working well with the preset detectable door opening, comprising: a rectangular working well (1) and supporting piles; wherein a bottom of the rectangular working well (1) is sealed, and a preset detachable door opening (3) is installed in the rectangular working well(1)the preset detachable door opening (3) is where jacking pipes are pushed in; the supporting piles are arranged against an inner wall of the rectangular working well (1), and a retaining plate (12) is spliced between two adjacent supporting piles; a height of the supporting piles is greater than a depth of the rectangular working well; to be specific, an upper part of the supporting piles is leveled with an upper part of the rectangular working well (1), whereas a lower part extends a distance to the soil below the bottom of the working well (1) for stabilizing the support piles; wherein a prefabricated crown beam (9) is provided on a top of the rectangular working well (1); the prefabricated crown beam (9) is bolted to the supporting pile; the crown beam (9) is installed on both sides of the supporting piles to clamp them; at least one inner supporting breast beam (13) is provided between the prefabricated crown beam (9) and the bottom (2) to support the crown beam (9); the supporting breast beam (13) is bolted to the supporting piles;

wherein the supporting piles include a detachable section supporting pile (4), a reinforced supporting pile (7) and a standard supporting pile (8), the detachable segmented supporting pile (4) is arranged at the preset detachable door opening (3) and it can be lengthened in the lengthwise direction by a tie bolt (5) and a connecting steel plate (6), the reinforced support pile (7) is placed opposite the preset detachable door opening (3); a cross-sectional area of the reinforced supporting piles (7) is larger than that of the detachable sectioned supporting pile (4) and that of the standard supporting pile (8).

4. The assembled recyclable rectangular working well with preset detachable door opening, as recited in claim 3, wherein hooks are provided on sides of an earth retaining panel (12), two hooks are provided on each side.

5. The assembled recyclable rectangular working well with preset detachable door opening, as recited in claim 3, wherein the rectangular working well (1) is provided with a ladder (15), and a hook is provided on the ladder (15); in the length direction of the ladder (15), the distance between the hooks is same with the distance between an inner support breast beams (13); the ladder (15) is connected to the inner support lumbar beam (13) by hooks.

\* \* \* \* \*